Patented June 23, 1931

1,811,142

UNITED STATES PATENT OFFICE

WILLIAM T. LITTLE, OF WESTFIELD, NEW JERSEY

PROCESS FOR THE RECOVERY OF TIN FROM ALKALINE STANNATE SOLUTIONS

No Drawing.    Application filed October 6, 1928.   Serial No. 310,931.

This invention relates to recovering tin as oxid; and it comprises a method of recovering tin in oxidized form particularly applicable to tin scrap wherein the tin of tin scrap is dissolved in and by the action of an alkaline solution containing dissolved nitrous gases, thereby forming alkali stannate and the tin is removed as tin oxid from the alkali stannate so formed by precipitating a solution thereof with nitrous gases, the mother liquor after removal of the tin oxid being returned to serve in detinning; all as more fully hereinafter set forth and as claimed.

In a well known method of recovering tin from tin scrap, the alkaline method, the scrap is treated with a 20 to 30 per cent solution of NaOH in the presence of some added oxidant. Tin dissolves as sodium stannate. After a time the solution becomes saturated with tin and sodium stannate crystallizes out. The stannate is removed, is freed of mother liquor by suction or a centrifugal and is dissolved in water. From the solution tin oxid is precipitated in hydrated form by converting the sodium hydroxide and sodium stannate in the solution into carbonate. Precipitation can be by the direct use of $CO_2$, but it is more common practice to use the $CO_2$ in the form of sodium bicarbonate; a solution of sodium carbonate being saturated with $CO_2$ and the saturated solution added to the tin solution as a precipitant. Since the solutions treated contain considerable quantities of caustic alkali, the use of rather large quantities of bicarbonate solution is necessary in order to obtain complete precipitation. After precipitation, the mother liquor is a solution of sodium carbonate. This is causticized to regain NaOH and is returned to the detinning bath. Concentration is always necessary as the causticized mother liquor is too weak for direct reuse. The $CO_2$ necessary for precipitation may come from the kilns furnishing the lime used in causticizing. In practice, the amount of lime used in causticizing is rather large since all the alkali in the solution gassed is converted into carbonate; not only that existing as sodium stannate but that present as free or caustic alkali. In addition, there is sodium carbonate coming from the detinning bath with the crystallized sodium stannate. In detinning, the alkali bath takes up $CO_2$ from the air and as sodium carbonate is not very soluble in caustic alkali solution of this strength, solid sodium carbonate separates and is withdrawn with the solid stannate.

In this process, the hydrated tin oxid is formed as a gel and considerable difficulty is experienced in separating it from the mother liquor and in washing, because of its rather slimy nature.

I have found that a precipitate of tin oxid in better physical form and more convenient to handle, may be obtained by use of nitrous gases as a precipitant in lieu of $CO_2$. And in so doing the whole process is improved. In particular, the precipitation with bicarbonate solution or $CO_2$ is entirely done away with and as a result no causticizing is necessary. The use of CaO is thus eliminated and the amount of evaporation necessary is greatly cut down.

Nitrous gases for the present purposes may be defined as the gases resulting from the oxidation of various materials (such as $As_2O_3$) with nitric acid, said gases being a mixture of various oxids of nitrogen, or as the gaseous mixture of nitrogen oxids made in the catalyzed oxidation of $NH_3$ with air. Nitrous gases from the oxidation of $NH_3$ are particularly suited. On bubbling nitrous gases through a solution of sodium stannate, or otherwise contacting the gases with the liquid, sodium nitrite and sodium nitrate are formed and tin oxid is thrown out in a form relatively easy to separate, wash and handle. The mother liquor because of its content of oxidizing bodies (nitrate and nitrite) and freedom from $CO_2$ can be returned for use in detinning. When necessary any concentration of this mother liquor by evaporation is more easily affected than the similar concentration of caustic alkali solutions necessary in the prior art.

In the practice of the present invention, tin scrap may be detinned by the action of a caustic alkali bath (the alkali being usually NaOH) containing dissolved nitrite and nitrate, action being continued till sodium stannate crystallizes out and the bath becomes impoverished in nitrate and nitrite. The solid stannate is then removed, redissolved in water and the tin precipitated by gassing with nitrous oxids. Tin oxid separates in a form readily recovered and washed. Any sodium carbonate occurring in admixture with the stannate is decomposed and the $CO_2$ is liberated in gaseous form. The washings and the mother liquor after such concentration as may be necessary, go back to the detinning bath to furnish nitrite and nitrate as oxidants.

The physical consistency of the precipitate formed by the nitrous gases varies somewhat with conditions. In making a product which is to be finally dehydrated and marketed as tin oxid I find it advantageous to maintain the solution during precipitation at a temperature of 70° C. or higher. There is no particular difficulty in separating the precipitate from the solution. The tin oxid does not come down in a slimy form hard to filterpress and wash as is the case in precipitation with bicarbonate. The precipitated tin oxid may be washed, dried and smelted in the event that metallic tin is desired. Or, the hydrated tin oxid may be washed, dried and calcined to give commercial tin oxid.

In a specific embodiment of my invention tin scrap was detinned in a suitable alkali bath until crystallized sodium stannate separated. This crystallized stannate on removal and on solution in water gave a liquor containing total alkali, as NaOH, 120 grams per liter, free NaOH, 28 grams per liter, soda as $Na_2CO_3$ 22.5 grams per liter and tin, 103.5 grams per liter. Through this solution were blown nitrous gases until the alkalinity was substantially neutralized. At this time the tin was thrown out of solution as hydrated tin oxid and the alkali converted into sodium nitrite and sodium nitrate, free of carbonate. This solution was returned to the detinning vat for renewed service in removing tin from tin scrap.

If gassing is not continued to neutrality, the liquor remains alkaline and some tin is left in solution, going back to the detinning bath.

Instead of blowing the nitrous gases through the solution to precipitate tin oxid, contact may be effected in a tower or any other suitable mechanical means adopted. In gassing the liquor, it is not necessary to neutralize the alkalinity entirely, although this is advantageous when the total removal of $CO_2$ is expected.

Weak solutions of sodium nitrite and nitrate obtained in filterpressing and washing the precipitate may be concentrated or used as additions to other detinning baths.

In complete neutralization of the alkalinity by nitrous gases in precipitation, the solution going to the detinning apparatus is a neutral solution of nitrate and nitrite of sodium free of tin and carbonates. Any $CO_2$ which may have been taken up by the solution in process, is displaced by the nitrous gases. In detinning the nitrate and nitrite are reduced with re-formation of caustic soda which takes the tin into solution as sodium stannate.

While I have mentioned more particularly the use of baths containing caustic soda it will be understood that caustic potash can be used in its lieu. The action is exactly the same and since the same bath can be used repeatedly and there is no necessary waste of alkali, it is feasible to use potassium compounds in lieu of sodium compounds in spite of their higher price.

What I claim is:

1. In recovering tin in detinning processes with cyclic use of baths, the process which comprises detinning in an alkaline bath containing alkali nitrate and nitrite until a substantial amount of solid alkali stannate is formed, removing such stannate, reacting upon such stannate in solution with nitrous gases to precipitate tin oxid, removing the precipitate and returning the liquor to the detinning bath.

2. In the treatment of alkaline tin solutions for recovering tin oxid therefrom, the process which comprises precipitating such a solution with nitrous gases.

3. In the treatment of alkaline tin solutions for recovering tin oxid therefrom, the process which comprises precipitating such a solution with the nitrous gases resulting from the catalyzed oxidation of ammonia with air.

4. In recovering tin from tin scrap by the alkaline process, the process which comprises detinning scrap in an alkaline solution containing alkali nitrate and nitrite until crystallized alkali stannate forms, removing the crystallized stannate, redissolving in water, precipitating the tin oxid from the solution by contacting with nitrous gases, thereby forming dissolved nitrite and nitrate, concentrating the mother liquor and returning the concentrated solution of nitrite and nitrate to the detinning system.

In testimony whereof I affix my signature.

WILLIAM T. LITTLE.